United States Patent
Tamura (10) Patent No.: US 9,014,641 B2
(45) Date of Patent: Apr. 21, 2015

(54) COMMUNICATION APPARATUS, METHOD OF PROCESSING THEREBY, AND NON-TRANSITORY COMPUTER-READABLE STORAGE MEDIUM

(75) Inventor: Ichiro Tamura, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 136 days.

(21) Appl. No.: 13/287,450

(22) Filed: Nov. 2, 2011

(65) Prior Publication Data
US 2012/0142272 A1  Jun. 7, 2012

(30) Foreign Application Priority Data
Dec. 7, 2010 (JP) ................ 2010-273019

(51) Int. Cl.
| H04B 17/00 | (2006.01) |
| H04B 7/00 | (2006.01) |
| H04W 76/04 | (2009.01) |
| H04W 28/04 | (2009.01) |
| H04W 84/12 | (2009.01) |
| H04W 84/18 | (2009.01) |

(52) U.S. Cl.
CPC .......... *H04W 76/048* (2013.01); *H04W 28/048* (2013.01); *H04W 84/12* (2013.01); *H04W 84/18* (2013.01)

(58) Field of Classification Search
CPC ............ H04B 7/26; H04B 17/00; H04B 7/24; H04B 7/00; H04B 7/06; H04B 17/0032; H04B 17/0057; H04B 17/0097; H04B 17/02; H04B 7/005; H04B 7/02; H04B 7/0404; H04B 7/0689

USPC ................ 455/91, 130, 412.1, 561, 67.11
See application file for complete search history.

(56) References Cited

U.S. PATENT DOCUMENTS

| 6,556,822 | B1 * | 4/2003 | Matsumoto ................ 455/421 |
| 6,847,625 | B2 * | 1/2005 | Heinonen et al. ........... 370/338 |
| 7,310,325 | B2 * | 12/2007 | Maeno .......................... 370/338 |
| 7,317,732 | B2 * | 1/2008 | Mills et al. .................. 370/445 |
| 7,672,254 | B2 * | 3/2010 | Kim et al. .................... 370/256 |
| 8,045,960 | B2 * | 10/2011 | Orakkan ...................... 455/411 |
| 8,369,800 | B2 * | 2/2013 | Li et al. ......................... 455/91 |
| 8,406,725 | B2 * | 3/2013 | Plestid et al. ................ 455/403 |

(Continued)

FOREIGN PATENT DOCUMENTS

| JP | 03009620 A | 1/1991 |
| JP | 2003-348104 A | 12/2003 |

(Continued)

OTHER PUBLICATIONS

Japanese Office Action issued in corresponding application No. 2010-273019 on Jul. 14, 2014.

*Primary Examiner* — Andrew Wendell
*Assistant Examiner* — Maryam Soltanzadeh
(74) *Attorney, Agent, or Firm* — Carter, DeLuca, Farrell & Schmidt, LLP (57) ABSTRACT

A communication apparatus transmits an annunciation signal and detects an annunciation-signal transmission apparatus that is transmitting an annunciation signal. The communication apparatus places the transmission of its annunciation signal in a suspended state when annunciation-signal transmission apparatuses in excess of a predetermined number thereof are detected in a case where the communication apparatus is not currently connected to another communication apparatus.

13 Claims, 6 Drawing Sheets

(56) References Cited

U.S. PATENT DOCUMENTS

| | | | |
|---|---|---|---|
| 8,514,758 B2 * | 8/2013 | De Kimpe et al. | 370/311 |
| 2005/0227700 A1 * | 10/2005 | Kirkland et al. | 455/453 |
| 2011/0275361 A1 * | 11/2011 | Yavuz et al. | 455/422.1 |

FOREIGN PATENT DOCUMENTS

| | | |
|---|---|---|
| JP | 2005-45616 A | 2/2005 |
| JP | 2008-301006 A | 12/2008 |

* cited by examiner

COMMUNICATION APPARATUS, METHOD OF PROCESSING THEREBY, AND NON-TRANSITORY COMPUTER-READABLE STORAGE MEDIUM

BACKGROUND OF THE INVENTION

1. Field of the Invention

The present invention relates to a communication apparatus, a method of processing executed by the communication apparatus, and a non-transitory computer-readable storage medium storing the related program.

2. Description of the Related Art

An infrastructure mode in which a base station serving as an access point exists and an adhoc mode formed by a plurality of terminal stations are known as modes of wireless communication (communication using a wireless LAN, for example) compliant with the IEEE 802.11 standard. In the infrastructure mode, the base station periodically transmits an annunciation signal referred to as a "beacon" that includes information concerning its own apparatus. In the adhoc mode, each terminal station constructing the network periodically transmits an annunciation signal (beacon) that includes information concerning its own apparatus.

As a technique relating to such an annunciation signal, the specification of Japanese Patent Laid-Open No. 2008-301006 mentions a technique in which, in the infrastructure mode, a base station suspends the transmission of the annunciation signal if an interference signal is detected. Further, the specification of Japanese Patent Laid-Open No. 2005-45616 mentions a technique in which, in the adhoc mode, the transmission of a signal, inclusive of an annunciation signal, requiring periodic transmission is omitted temporarily based upon acceptance obtained from all connected apparatuses.

Consider a case where a plurality of apparatuses that transmit annunciation signals ("annunciation-signal transmitting apparatuses") are present in the vicinity. A base station in the infrastructure mode and an annunciation-signal transmitting apparatus in the adhoc mode transmit annunciation signals periodically even in a case where they are not connected to another communication apparatus. In such case, the annunciation signals are a cause of interference in other networks.

With the technique described in Japanese Patent Laid-Open No. 2008-301006, the base station suspends transmission of its annunciation signal when an interference signal is detected. In such case, however, there is the possibility that an apparatus that could not receive the annunciation signal will recognize erroneously that it has been disconnected from the network for a fixed period of time. Further, the technique described in Japanese Patent Laid-Open No. 2005-45616 is such that in the case of an apparatus that is not compatible with the proposed method described in Japanese Patent Laid-Open No. 2005-45616, this apparatus will be incapable of executing the acceptance processing that is for the purpose of omitting transmission of the annunciation signal.

SUMMARY OF THE INVENTION

The present invention provides a technique for suspending the transmission of an unnecessary annunciation signal, which will cause interference with other signals, without resulting in problems that can accompany the suspension of the transmission of the annunciation signal.

According to a first aspect of the present invention, there is provided a communication apparatus comprising: a transmission unit configured to transmit an annunciation signal; a detection unit configured to detect an annunciation-signal transmission apparatus that is transmitting an annunciation signal; and a suspend unit configured to place transmission of the annunciation signal by the transmission unit in a suspended state when annunciation-signal transmission apparatuses in excess of a predetermined number thereof are detected by the detection unit in a case where the communication apparatus is not currently connected to another communication apparatus.

According to a second aspect of the present invention, there is provided a method of processing executed by a communication apparatus, comprising: transmitting an annunciation signal; detecting an annunciation-signal transmission apparatus that is transmitting an annunciation signal; and placing transmission of the annunciation signal in a suspended state when annunciation-signal transmission apparatuses in excess of a predetermined number thereof are detected in a case where the communication apparatus is not currently connected to another communication apparatus.

According to a third aspect of the present invention, there is provided a non-transitory computer-readable storage medium storing a computer program for causing a computer incorporated within a communication apparatus to function as: a transmission unit configured to transmit an annunciation signal; a detection unit configured to detect an annunciation-signal transmission apparatus that is transmitting an annunciation signal; and a suspend unit configured to place transmission of the annunciation signal by the transmission unit in a suspended state when annunciation-signal transmission apparatuses in excess of a predetermined number thereof are detected by the detection unit in a case where the communication apparatus is not currently connected to another communication apparatus.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

It should be noted that although the description below is rendered with regard to a case where the invention is applied to a wireless LAN system compliant with the IEEE 802.11 series, the form of communication is not necessarily limited to an IEEE 802.11-compliant wireless LAN. For example, the form of communication used may be compliant with a scheme other than that mentioned.

First Embodiment

Figure 1:
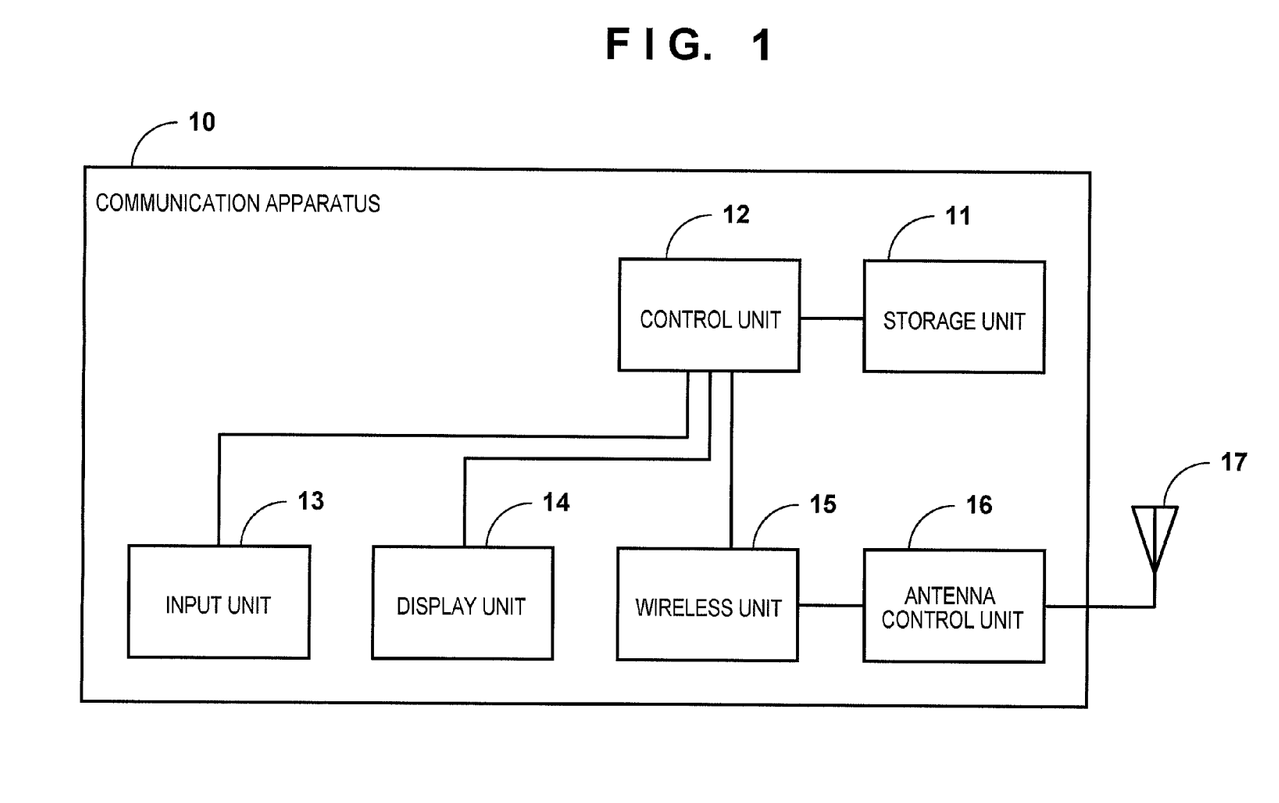
FIG. 1 is a diagram illustrating an example of the hardware configuration of a communication apparatus 10 according to an embodiment of the present invention.

FIG. 1 is a diagram illustrating an example of the hardware configuration of a communication apparatus 10 according to an embodiment of the present invention.

The communication apparatus 10 incorporates a computer. Specifically, the communication apparatus 10 includes a storage unit 11, a control unit 12, an input unit 13, a display unit 14, a wireless unit 15, an antenna control unit 16 and an antenna 17.

The storage unit 11 stores various information such as information necessary for communication. The storage unit 11 is implemented by a memory such as a RAM or ROM or by a flexible disk, hard disk, optical disk, magneto-optical disk, CD-ROM, CD-R, magnetic tape, non-volatile memory card or DVD.

The input unit 13, which is implemented by a touch-sensitive panel or buttons, etc., allows a user to input various commands to the apparatus. The display unit 14, which is implemented by an LCD, LED or the like, displays various information to the user. The antenna control unit 16 controls the antenna 17 and the wireless unit 15 controls wireless communication via the antenna control unit 16 and antenna 17. The control unit 12, which is implemented by a CPU, RAM, ROM and the like, exercises overall control of the operation of the communication apparatus 10.

Figure 2:
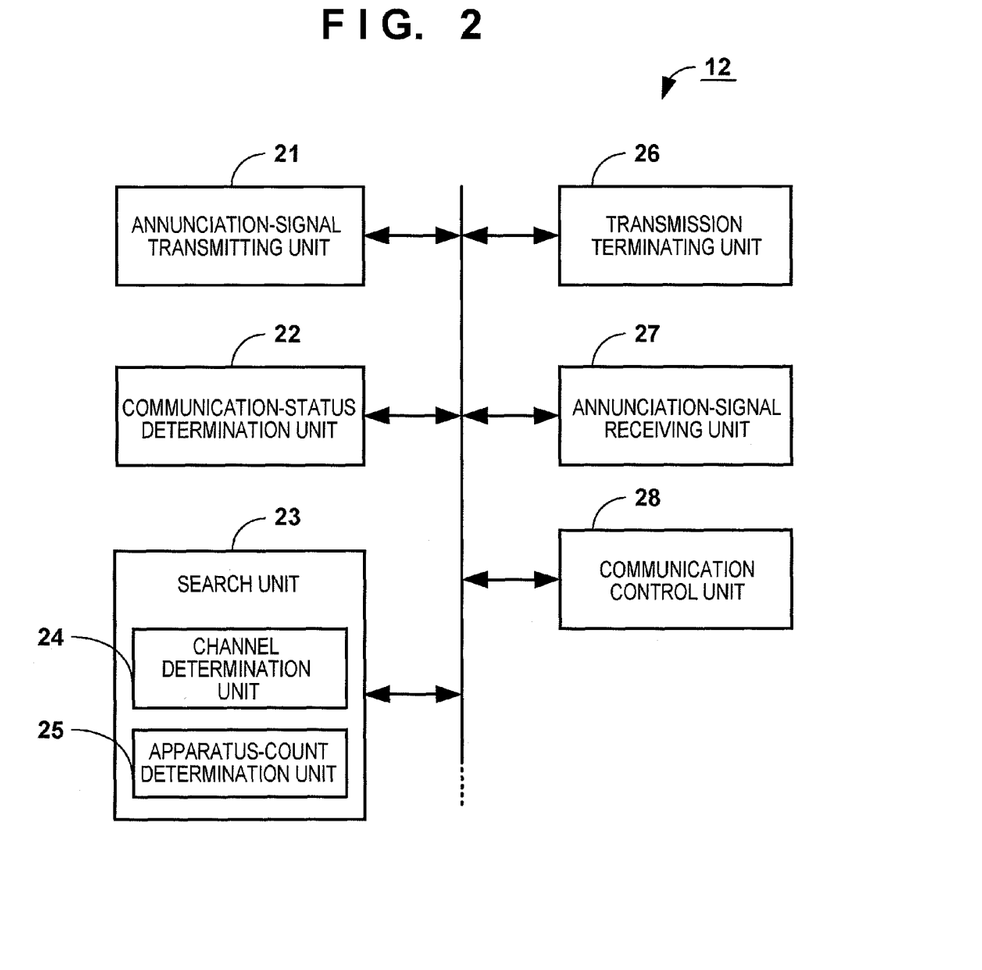
FIG. 2 is a diagram illustrating an example of a functional configuration implemented by a control unit 12 shown in FIG. 1.

An example of the functional configuration implemented by the control unit 12 shown in FIG. 1 will be described with reference to FIG. 2. It should be noted that each component in the control unit 12 is implemented by having the CPU read out and execute a program that has been stored in the ROM or the like, by way of example.

The functional components implemented in the control unit 12 are an annunciation-signal transmission unit 21, a communication-status determination unit 22, a search unit 23, a transmission suspension unit 26, an annunciation-signal reception unit 27 and a communication control unit 28.

The annunciation-signal transmission unit 21 transmits an annunciation signal cyclically (periodically) via the antenna 17, etc. The annunciation-signal reception unit 27 receives an annunciation signal via the antenna 17, etc. It should be noted that although a beacon is mentioned as an example of the annunciation signal, it may be any signal so long as the signal is one transmitted periodically. The communication-status determination unit 22 determines the communication status of its own apparatus. For example, the communication-status determination unit 22 determines whether the apparatus is currently connected to another communication apparatus or whether transmission of an annunciation signal is in progress.

The search unit 23 searches for (detects) the presence of another communication apparatus based upon an annunciation signal received from the other communication apparatus. It should be noted that the search unit 23 may search for the presence of another communication apparatus by transmitting a probe request and receiving a probe response as the result, by way of example.

Here the search unit 23 includes a channel determination unit 24 and an apparatus-count determination unit 25 as functional components. The channel determination unit 24 analyzes the annunciation signal from another communication apparatus and determines whether the other communication apparatus is utilizing a band (channel) identical with that of its own apparatus. The apparatus-count determination unit 25 analyzes the annunciation signals from other communication apparatuses and determines the number of other communication apparatuses that have been determined to be utilizing a band (channel) identical with that of its own apparatus.

The transmission suspension unit 26 suspends the transmission of the annunciation signal (from its own apparatus) based upon the result of analysis by the search unit 23. More specifically, if the result of analysis by the search unit 23 is that the number of other communication apparatuses that have been determined to be utilizing a channel identical with that of its own apparatus is greater than a predetermined number, the transmission terminating unit 26 suspends the transmission of the annunciation signal from the annunciation-signal transmission unit 21.

The communication control unit 28 controls a variety of communication. The communication control unit 28 functions as a base-station function unit if the communication apparatus 10 operates in the infrastructure mode and functions as a terminal-station function unit if the communication apparatus 10 operates in the adhoc mode.

The foregoing is a description regarding an example in which functional components are implemented by the control unit 12. However, the arrangement illustrated here is not necessarily limited to this implementation and suitable modifications are possible. For example, the channel determination unit 24 may be eliminated and it may be arranged so that the number of apparatuses is determined based upon annunciation signals irrespective of whether the channel is identical or not.

Figure 3:
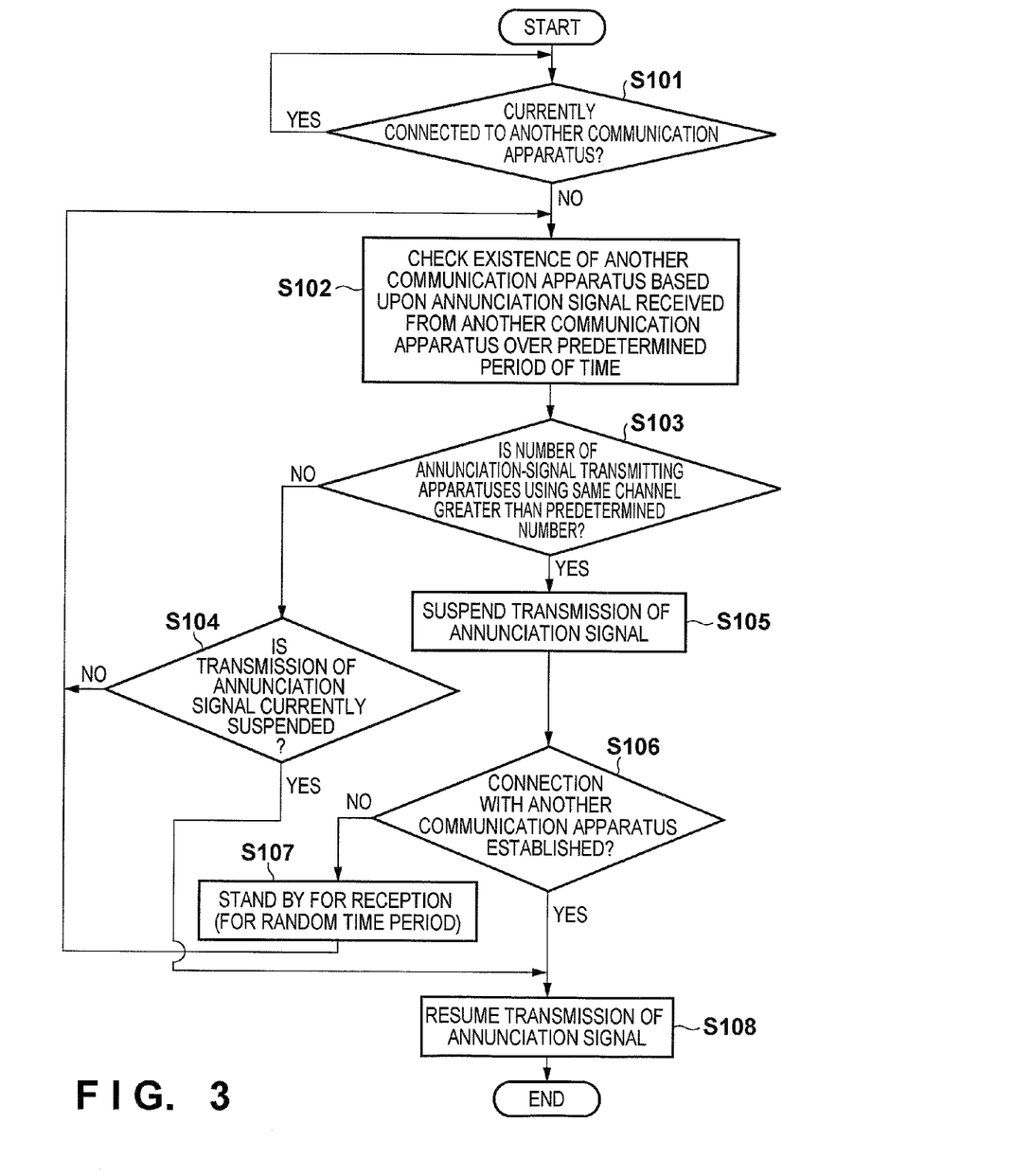
FIG. 3 is a flowchart illustrating an example of the flow of processing executed by the communication apparatus 10 shown in FIG. 1.

Next, an example of the flow of processing by the communication apparatus 10 shown in FIG. 1 will be described with reference to FIG. 3. Here the flow of processing for controlling transmission of an annunciation signal will be described.

Using the communication-status determination unit 22, the communication apparatus 10 determines whether it is currently connected to another communication apparatus (step S101). If the result of this determination is that this apparatus is currently connected to another communication apparatus ("YES" at step S101), then the communication apparatus 10 continues the operation of transmitting an annunciation signal cyclically until the connection to the other communication apparatus is severed. In a case where the communication apparatus 10 is operating as a base station, it cyclically transmits a beacon as the annunciation signal. If the communication apparatus 10 is operating in the adhoc mode, it cyclically transmits a beacon as the annunciation signal alternatingly with the other communication apparatus to which it is connected.

If the communication apparatus 10 is not currently connected to another communication apparatus ("NO" at step S101), then the communication apparatus 10 uses the search unit 23 to determine the presence of another communication apparatus based upon an annunciation signal received from the other communication apparatus over a predetermined period of time (step S102). More specifically, first the communication apparatus 10 uses the channel determination unit 24 to determine whether another communication apparatus is utilizing a channel identical with that of its own apparatus, and then uses the apparatus-count determination unit 25 to determine the number of other communication apparatuses that have been determined to be utilizing the channel identical with that of its own apparatus.

If the result of the determination is that the number of other communication apparatuses utilizing the same channel is not greater than the predetermined number ("NO" at step S103), then the communication apparatus 10 uses the communication-status determination unit 22 to determine whether transmission of the annunciation signal is currently suspended. If the annunciation signal is not currently suspended ("NO" at step S104), the communication apparatus 10 returns to the processing of step S102. If the annunciation signal is currently suspended ("YES" at step S104), then the communication apparatus 10 uses the annunciation-signal transmission unit 21 to resume transmission of its annunciation signal (step S108) and then terminates processing.

Further, if the result of the determination at step S103 is that the number of other communication apparatuses utilizing the same channel is greater than the predetermined number ("YES" at step S103), the communication apparatus 10 uses the transmission terminating unit 26 to suspend the transmission of its annunciation signal (step S105). Thereafter, the communication apparatus 10 uses the communication control unit 28 to perform monitoring to ascertain whether processing for connecting to another communication apparatus has been executed.

If the status of the communication apparatus 10 indicates that it has not been connected to another communication apparatus ("NO" at step S106), the communication apparatus 10 returns to the processing of step S102 upon elapse of a random period of time (reception standby time) (step S107). At the reception standby processing of step S107, the communication apparatus 10 sends back an answer signal (as necessary) in response to a signal received from another communication apparatus. (For example, when a probe request signal is received, the communication apparatus 10 replies with a probe response.) However, it does not transmit an annunciation signal and does not check the number of other communication apparatuses, etc. It should be noted that the random period of time, namely the reception standby time, is generated randomly each time within a prescribed range of numerical values.

If the result of the determination made at step S106 is that processing for establishing a connection between the communication apparatus 10 and another communication apparatus has been executed and that a connection is in progress ("YES" at step S106), then the communication apparatus 10 uses the annunciation-signal transmission unit 21 to resume transmission of its annunciation signal (step S108). That is, a condition for resuming transmission of the annunciation signal in the communication apparatus 10 is that the communication apparatus 10 be connected to another communication apparatus or that the number of other communication apparatuses that utilize the same channel be less than the predetermined number. It should be noted that suspension of transmission of the annunciation signal continues until the condition for resuming the transmission of the annunciation signal is satisfied.

Next, an example of the flow of processing in a communication system having the communication apparatus 10 shown in FIGS. 1 and 2 will be described with reference to FIG. 5. Described will be the flow of processing when, in an environment in which other communication apparatuses 32 and 33 are currently connected to each other, as shown in FIG. 4, the communication apparatus 10 suspends transmission of its annunciation signal and thereafter connects to another communication apparatus 31 and resumes transmission of the annunciation signal.

Figure 4:
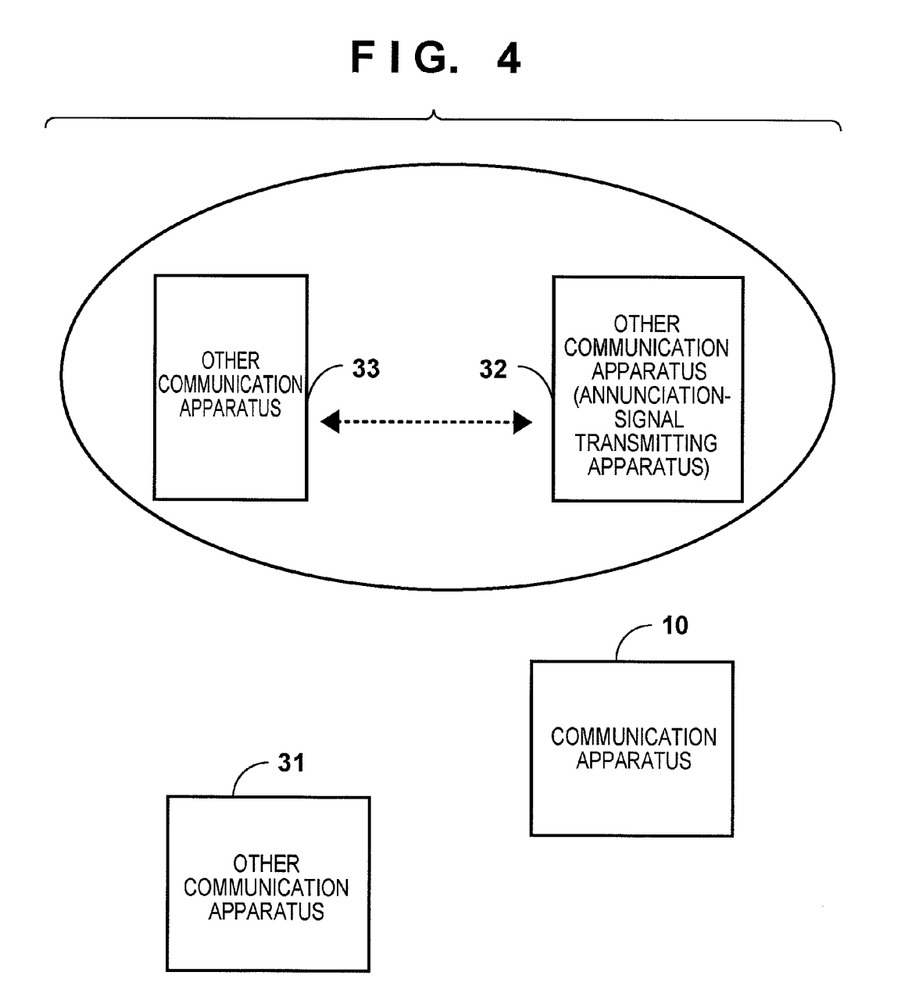
FIG. 4 is a diagram illustrating an example of the configuration of a communication system having the communication apparatus shown in FIG. 1.
Figure 5:
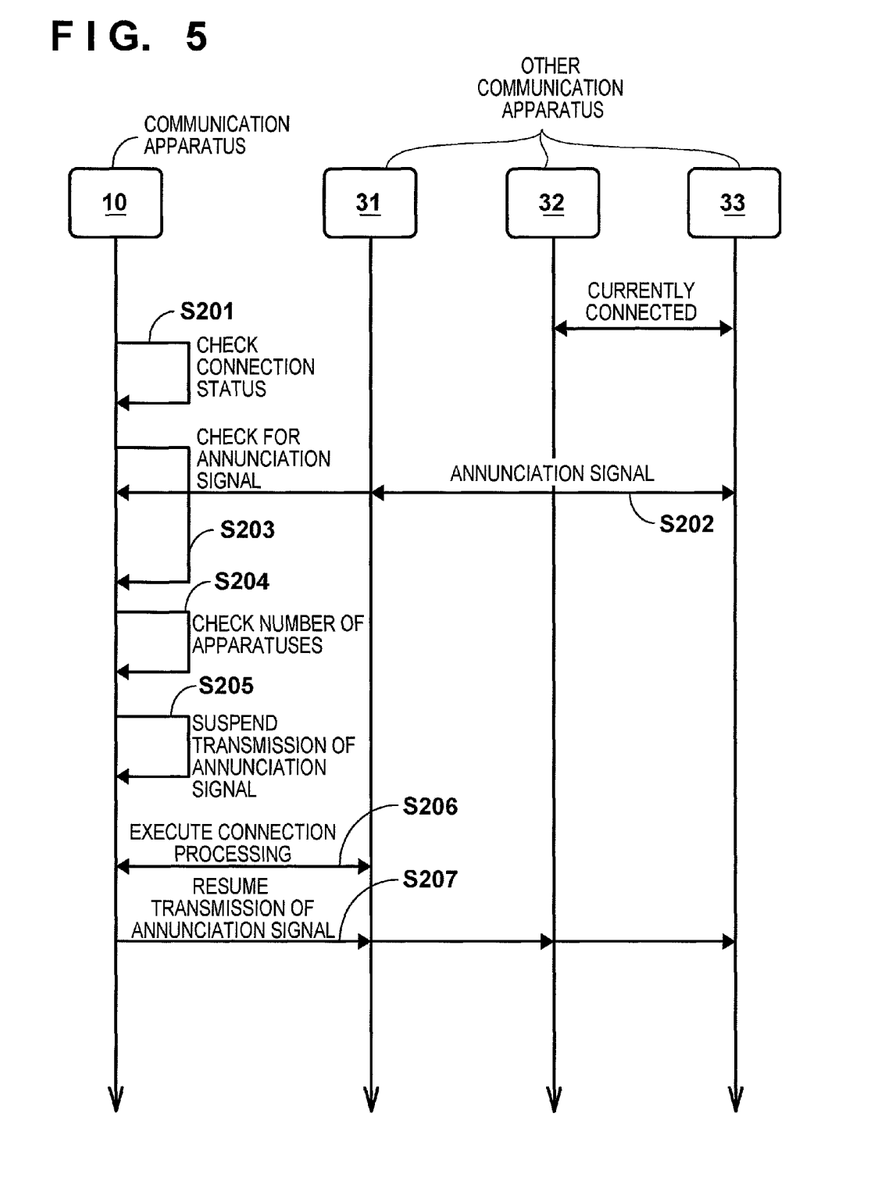
FIG. 5 is a sequence diagram illustrating an example of the flow of processing executed by the communication system shown in FIG. 4.

It will be assumed that the other communication apparatuses 31 to 33 shown in FIG. 4 perform communication utilizing a channel identical with that of the communication apparatus 10. It will be assumed that the other communication apparatus 32 functions as a base station (access point) and that it transmits a beacon cyclically. That is, one or a plurality of other communication apparatuses (other communication apparatuses 31 to 33) inclusive of an annunciation-signal transmitting apparatus (other communication apparatus 32), which transmits an annunciation signal, are provided in the vicinity of the communication apparatus 10. It will be assumed that the other communication apparatus 32 is provided with components similar to the components described in FIGS. 1 and 2 above.

First, the communication apparatus 10 checks to determine whether it is currently connected to another communication apparatus (S201). In this case, the communication apparatus 10 has not been connected to another communication apparatus and therefore receives an annunciation signal from another communication apparatus over a predetermined period of time (S202). At this time the other communication apparatus 32 is currently connected to the other communication apparatus 33 and therefore transmits an annunciation signal periodically (S203).

The communication apparatus 10 receives the annunciation signal (indicated at S202) from the other communication apparatus 32 over the predetermined period of time. As a result, the communication apparatus 10 recognizes the existence of the other communication apparatus 32. In response to the result of S203, the communication apparatus 10 checks the number of other communication apparatuses that exceed a predetermined number (S204). In order to facilitate understanding of the description, it will be assumed that the predetermined number is one. In actuality, it will suffice to decide the predetermined number based upon the communication environment, functions of the communication apparatuses and causes of interference, etc.

As a result of the foregoing, the communication apparatus 10 suspends transmission of its annunciation signal (S205). Following this suspension of transmission of the annunciation signal, the communication apparatus 10 executes processing for connecting to the other communication apparatus 31 (S206). It should be noted that in a case where the communication apparatus 10 and other communication apparatus 31 are operating in the infrastructure mode, the communication apparatus 10 executes the connection processing by replying to a connection request from the other communication apparatus 31 with a connection-request response. In a case where the communication apparatus 10 and other communication apparatus 31 are operating in the adhoc mode, the communication apparatus 10 replies to a search signal (probe request) from the other communication apparatus 31 with a search response (probe response). The other communication apparatus 31 then makes its BBSID (Basic Service Set Identifier), which is the network identifier, the same as that of the communication apparatus 10 and transmits it annunciation signal to thereby establish connection to the communication apparatus 10.

Since the communication apparatus 10 is now connected to the other communication apparatus 31, it resumes transmission of its annunciation signal (S207). It should be noted that if the connection between the other communication apparatuses 32 and 33 has been severed in a state in which the communication apparatus 10 and the other communication apparatus 31 are connected, the other communication apparatus 32 suspends the transmission of its annunciation signal by the processing shown in FIG. 3.

In this embodiment, factors that lead to interference with other networks are diminished by thus suspending the transmission of unnecessary annunciation signals. Further, since annunciation-signal transmission is suspended, supply of power to the transmission circuit can be eliminated. This makes it possible for the communication apparatus 10 to operate with less consumption of power.

Figure 6:
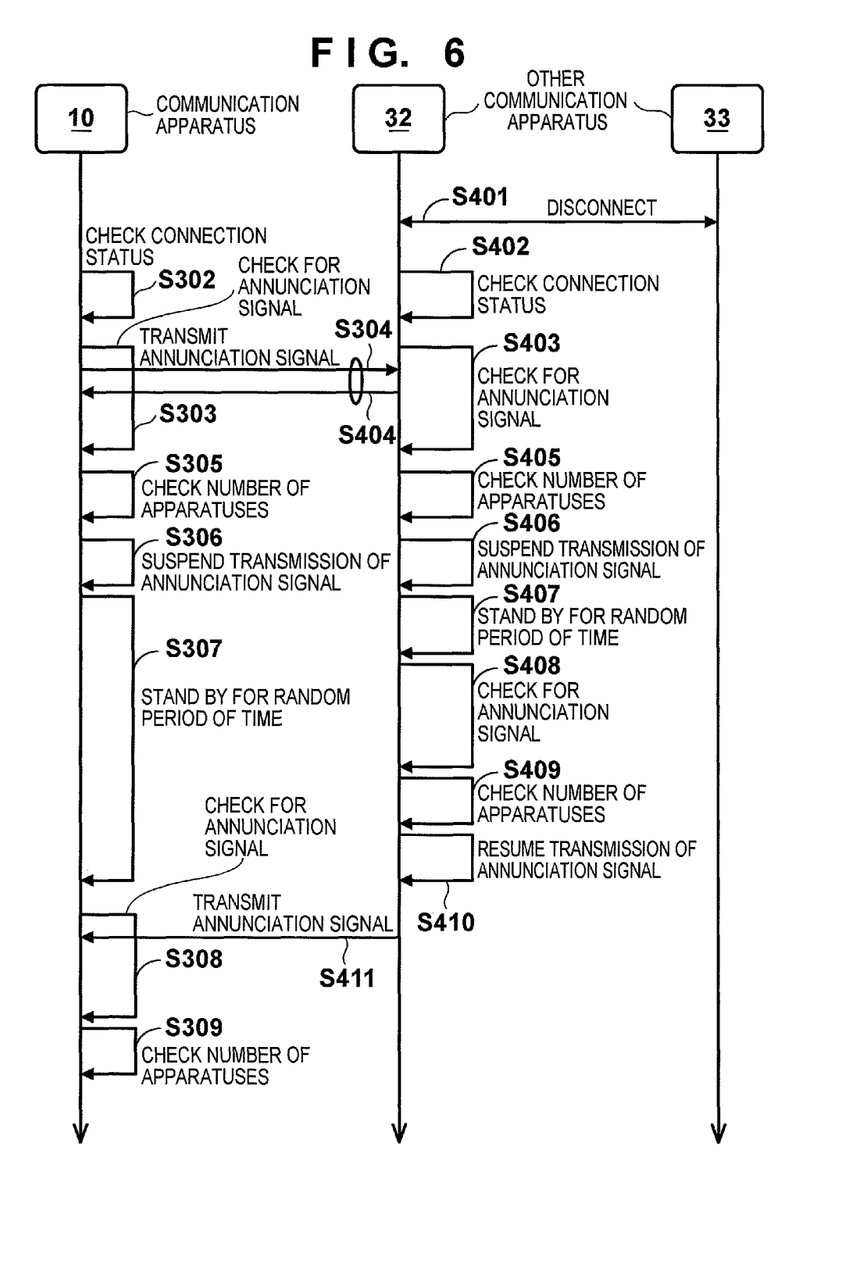
FIG. 6 is a sequence diagram illustrating an example of the flow of processing executed by the communication system shown in FIG. 4.

Next, an example of the flow of processing in a communication system having the communication apparatus 10 shown in FIGS. 1 and 2 will be described with reference to FIG. 6. Described will be the flow of processing when, in an environment in which other communication apparatuses 32 and 33 are currently connected to each other, as shown in FIG. 4, the connection between the other communication apparatuses 32 and 33 is severed and the communication apparatus 10 and other communication apparatus 32 simultaneously execute processing for suspending transmission of their annunciation signals.

According to this processing, first the connection between the other communication apparatuses 32 and 33 is severed (S401). The communication apparatus 10 and other communication apparatus 32 subsequently check to determine whether they are currently connected to another communication apparatus (S302 and S402). Since neither the communication apparatus 10 nor the other communication apparatus 32 is currently connected in this case, they receive an annunciation signal from another communication apparatus over a predetermined period of time (S303 and S403). Since the communication apparatus 10 and other communication apparatus 32 are transmitting their annunciation signals cyclically, they receive each other's annunciation signal over a predetermined period of time (S304 and S404). As a result, the communication apparatus 10 and other communication apparatus 32 recognize each other's existence (S305 and S405) and suspend transmission of their annunciation signals (S306 and S406).

Following suspension of transmission of the annunciation signals, the communication apparatus 10 and other communication apparatus 32 stand by for reception a random period of time (S307 and S407). In this case, the reception standby times set in the communication apparatus 10 and other communication apparatus 32 are different and it will be assumed that the other communication apparatus 32 has the shorter reception standby time.

When reception standby at the other communication apparatus 32 ends, the communication apparatus 32 receives an annunciation signal from another communication apparatus for the predetermined period of time (S408). It should be noted that since the communication apparatus 10 is currently standing by for reception, the other communication apparatus 32 cannot recognize the existence of any apparatus, including the communication apparatus 10, and the number of apparatuses recognized by the other communication apparatus 32 is zero (S409).

As a consequence, the other communication apparatus 32 resumes transmission of its annunciation signal (S410). On the other hand, the communication apparatus 10 for which reception standby has ended receives an annunciation signal from another communication apparatus for the predetermined period of time (S308). The communication apparatus 10 receives the annunciation signal from the other communication apparatus 32 (S411). As a result, the communication apparatus 10 recognizes the existence of the other communication apparatus 32 and, hence, does not resume transmission of its annunciation signal (S309) and again stands by for reception for a random period of time. The communication apparatus 10 repeats the processing of FIG. 3 from this point onward.

In this embodiment, reception standby is thus performed over a random period of time. As a result, even in a case where there are a plurality of apparatuses (which determine suspension of transmission of their annunciation signals at identical timings) having the arrangements shown in FIGS. 1 and 2 and these apparatuses have suspended transmission of their annunciation signals simultaneously, resumption of transmission of the annunciation signals all at once can be suppressed.

In accordance with this embodiment, as described above, if a communication apparatus is not currently connected to other communication apparatuses, the apparatus determines the number of other communication apparatuses (which transmit annunciation signals) based upon the annunciation signals received from the other communication apparatuses over a predetermined period of time and suspends transmission of its annunciation signal if the number of the other communication apparatuses exceeds a predetermined number.

Further, if a communication apparatus executes processing for connection to another communication apparatus and the connection is established, or if the number of other communication apparatuses has fallen below the predetermined number, then the communication apparatus resumes transmission of its annunciation signal.

As a result, transmission of an unnecessary annunciation signal that will cause interference with other signals can be suspended without giving rise to problems that ordinarily accompany suspension of transmission of the annunciation signal (such as erroneously recognizing that an apparatus already connected to the network has been disconnected from the network, by way of example).

Although the foregoing is an example of a typical embodiment of the present invention, the present invention is not limited to the embodiment described above and illustrated in the drawings and can be worked upon being suitably modified without departing from the gist of the invention.

For example, although the foregoing embodiment is described taking as an example a case where a wireless LAN compliant with IEEE 802.11 is applied to the invention, this does not impose any limitation. For example, the invention may be applied to communication using another wireless medium such as a wireless USB, MBOA (MultiBand OFDM Alliance), Bluetooth (registered trademark), UWB (Ultra Wide Band) or ZigBee. Furthermore, the invention may be applied to communication using a wired communication medium such as a wired LAN. It should be noted that MBOA and UWB include a wireless USB, wireless 1394 and WINET, etc.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-273019 filed on Dec. 7, 2010, which is hereby incorporated by reference herein in its entirety.

What is claimed is:

1. A communication apparatus comprising:
a creation unit configured to create a wireless network;
a transmission unit configured to periodically transmit an annunciation signal to the wireless network to inform the wireless network of the existence of the communication apparatus;
a determination unit configured to determine whether the communication apparatus is currently connected to another communication apparatus via the wireless network;
a detection unit configured to detect annunciation-signal transmission apparatuses which are transmitting an annunciation signal; and
a control unit configured to:
in a case where it is determined that the communication apparatus is connected to another communication apparatus, control the transmission unit to periodically transmit the annunciation signal, and
in a case where it is determined that the communication apparatus is not connected to another communication apparatus, control the transmission unit to
(a) periodically transmit the annunciation signal if the number of the detected annunciation-signal transmission apparatuses exceeds a predetermined number, and
(b) restrict the transmission of the annunciation signal if the number of the detected annunciation-signal transmission apparatuses does not exceed the predetermined number.

2. The apparatus according to claim 1, wherein the transmission unit resumes transmission of the annunciation signal in a case where connection to another communication apparatus is established after transmission of the annunciation signal is restricted by the control unit.

3. The apparatus according to claim 1, wherein the transmission unit resumes transmission of the annunciation signal in a case where, after transmission of the annunciation signal is restricted by the control unit, the number of annunciation-signal transmission apparatuses has not exceeded the predetermined number.

4. The apparatus according to claim 1, wherein the detection unit detects the number of annunciation-signal transmission apparatuses when a predetermined time elapses following restriction of the annunciation signal by the control unit.

5. The apparatus according to claim 1, wherein the detection unit detects an annunciation-signal transmission apparatus transmitting on a channel identical with that of the communication apparatus.

6. A method of processing executed by a communication apparatus, comprising:
creating a wireless network;
periodically transmitting an annunciation signal to the wireless network to inform the wireless network of the existence of the communication apparatus;
determining whether the communication apparatus is currently connected to another communication apparatus via the wireless network;
detecting annunciation-signal transmission apparatuses which are transmitting an annunciation signal; and
in a case where it is determined that the communication apparatus is connected to another communication apparatus, periodically transmitting the annunciation signal; and
in a case where it is determined that the communication apparatus is not connected to another communication apparatus,
(a) periodically transmitting the annunciation signal if the number of the detected annunciation-signal transmission apparatuses exceeds a predetermined number, and
(b) restricting the transmission of the annunciation signal if the number of the detected annunciation-signal transmission apparatuses does not exceed the predetermined number.

7. A non-transitory computer-readable storage medium storing a computer program for causing a computer incorporated within a communication apparatus to function as:
a creation unit configured to create a wireless network;
a transmission unit configured to periodically transmit an annunciation signal to the wireless network to inform the wireless network of the existence of the communication apparatus;
a determination unit configured to determine whether the communication apparatus is currently connected to another communication apparatus via the wireless network;
a detection unit configured to detect annunciation-signal transmission apparatuses which are transmitting an annunciation signal; and
a control unit configured to:
in a case where it is determined that the communication apparatus is connected to another communication apparatus, control the transmission unit to periodically transmit the annunciation signal, and
in a case where it is determined that the communication apparatus is not connected to another communication apparatus, control the transmission unit to
(a) periodically transmit the annunciation signal if the number of the detected annunciation-signal transmission apparatuses exceeds a predetermined number, and
(b) restrict the transmission of the annunciation signal if the number of the detected annunciation-signal transmission apparatuses does not exceed the predetermined number.

8. The apparatus according to claim 1, wherein the annunciation signal is a signal to be transmitted in an IEEE 802.11-compliant wireless LAN.

9. The apparatus according to claim 1, wherein the annunciation signal is a beacon.

10. The apparatus according to claim 1, wherein the apparatus is operable as a base-station or as a terminal station.

11. The apparatus according to claim 1, wherein the control unit restricts the transmission of the annunciation signal by suspending the transmission of the annunciation signal.

12. The apparatus according to claim 1, wherein the predetermined number is one.

13. The apparatus according to claim 1, wherein, if a probe request is received after the control unit controls the transmission unit to restrict the transmission of the annunciation signal, the transmission unit transmits a probe request.

* * * * *